Jan. 16, 1934.  A. G. THATCHER  1,943,639
SPOON SUPPORT MEANS FOR CONTAINERS
Filed April 18, 1931
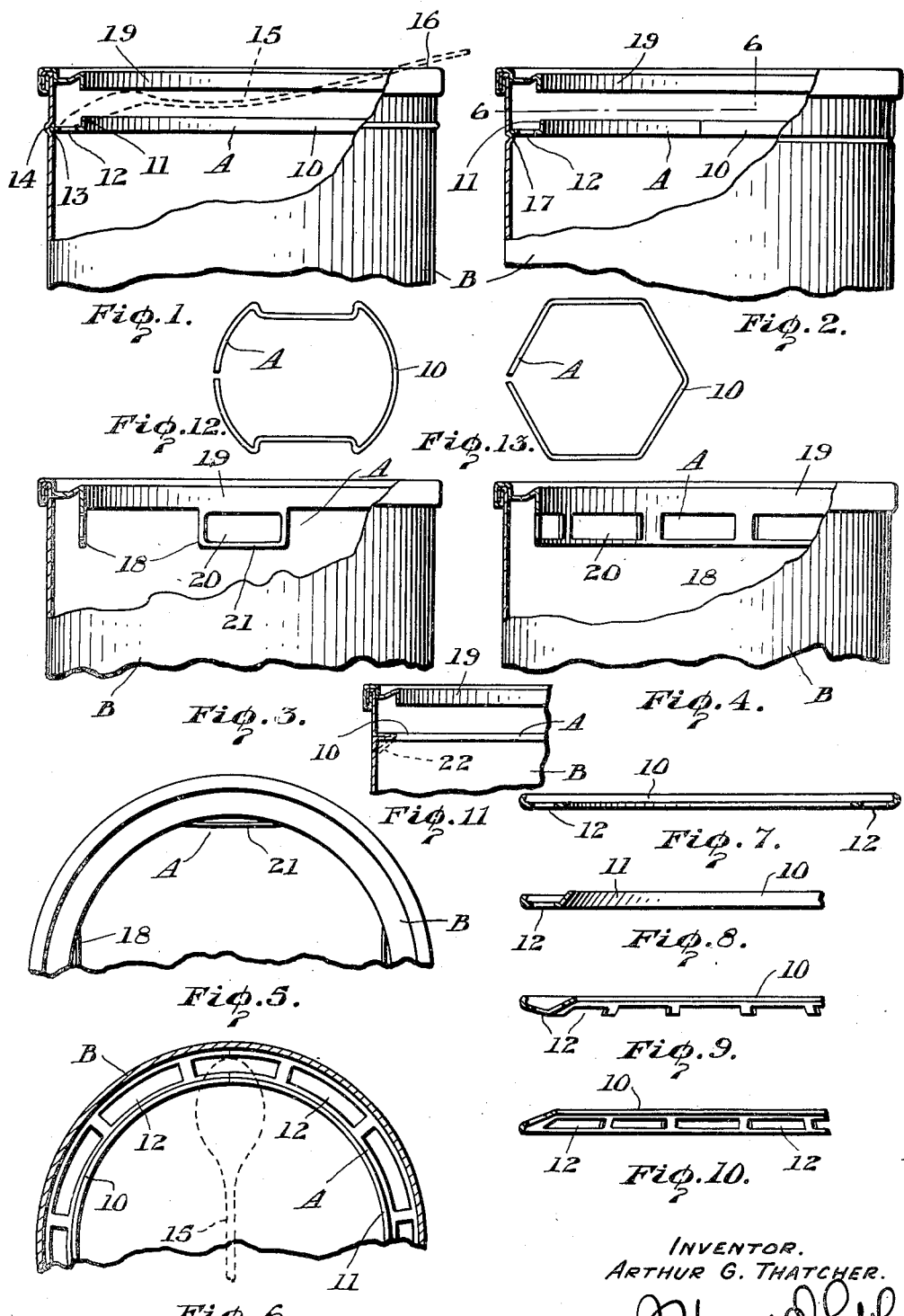
INVENTOR.
ARTHUR G. THATCHER.
BY
ATTORNEY Patented Jan. 16, 1934

1,943,639

UNITED STATES PATENT OFFICE 1,943,639

SPOON SUPPORT MEANS FOR CONTAINERS

Arthur Guy Thatcher, Boyle, Alberta, Canada

Application April 18, 1931. Serial No. 531,073

2 Claims. (Cl. 220—85)

This invention relates to spoon support means for containers, and one of the main objects of the invention is to provide a support within containers upon which a spoon or other dispensing device may rest, thus permitting any drip from the spoon to fall within the container.

Under ordinary conditions where a container is filled with syrup, jam or the like, the dispensing spoon is placed on the top thereof with the handle resting on one side and the spoon bowl on the other side. In this position the spoon allows a drip to run over the side of the container, creating unpleasant conditions, or frequently falls into and becomes buried in the contents of the container and is only recovered after a most disagreeable operation.

The present invention with its simplicity of design and practical construction is adapted to overcome conditions such as have been pointed out. Therefore, one of the objects of the invention is to provide a spoon support for containers which will permit the bowl portion of the spoon to rest within the container, and permit any material on the spoon to drain therewithin, while the handle thereof rests on the top of the container free from the contents of the container.

A further object of the invention is to provide a support of this character in containers wherein the spoon is clean and always readily accessible, at the same time preventing the contents of the container from becoming smeared over the outside thereof.

Another object of the invention is to provide spoon supporting means of the character described which may be conveniently embodied in containers such as friction cover syrup cans, preserve bottles and like containers without interfering with the normal structure of the device and at the same time permit the removal of the contents of the container without difficulty.

A still further object of the invention is to provide a simple and inexpensive device of this nature which may be embodied in containers without materially increasing the cost thereof.

Bearing the foregoing remarks in mind, the invention consists of the novel and practical combination and arrangement which will be more fully set forth in the following specification and drawing which illustrate the same.

In the drawing:

Figure 1 is a fragmentary elevation, partly in section, illustrating my improved spoon support fixedly mounted within a container, the dotted lines indicating a spoon resting in a draining position.

Figure 2 is a view similar to Fig. 1 illustrating a spoon support in detachable form.

Figure 3 is an elevation of a container, partly in section, showing independent spoon rests or supports formed integral with the friction grip of the container.

Figure 4 is a view similar to Fig. 3 indicating a continuous formation of spoon supports formed integral with the friction grip of the container.

Figure 5 is a fragmentary plan view of Figure 3 indicating the lower portion of the spoon support slightly bulged towards the center of the container.

Figure 6 is a section taken on the line 6—6 of Fig. 2.

Figure 7 is a sectional elevation of one of the detached spoon supports of a modified form, which in formation is illustrated as being substantially flat.

Figure 8 is a sectional elevation of a further modification of a detached spoon support illustrating the inner lip thereof disposed at an angle.

Figure 9 is a further modification of a spoon support of substantially V-shaped formation.

Figure 10 is a further modification of the spoon support of substantially conoidal form, and Figure 11 illustrates an integral spoon support formed by grooving the wall of the container.

Figures 12 and 13 illustrate detached spoon support inserts formed of spring wire or the like.

Referring now to the drawing in which my device is illustrated and in which like characters of reference refer to corresponding parts throughout the several views, the character A designates the spoon support or shelf which in the present illustration is indicated as being mounted in a container B. The container in this particular case has been illustrated as a type requiring a friction cover, and it will be understood that this form of container is used for illustrative purposes as other types of containers such as bottles, jars, etc. may be provided with the improved spoon supporting means.

The spoon support as illustrated in the present invention may be fixed within the container, preferably adjacent the top thereof, or it may be of the detachable type, and comprises an annular ring member 10 provided at its inner periphery with a lip or ledge 11 and adjacent thereto a series of drip orifices 12. The external edge of the member 10 is provided with a bead 13 which as indicated in Fig. 1 engages the outwardly projecting bead 14 formed on the container and thus the spoon support is firmly retained in a fixed position.

For purposes of illustration, I have shown in dotted lines as indicated at 15, the bowl of the spoon resting on the support member 10, in the interior of the container with the handle resting on the upper edge 16 of the container. The spoon, it will be observed, is reversed or upside down and in this position any liquid material or the like either on the handle portion or bowl portion thereof will drip back within the container, the orifices 12 permitting the drip to pass through the supporting shelf 10 into the container proper.

The main principle involved in the present invention is the embodiment of supporting means for a spoon within a container. The supporting means may conveniently take different forms without departing from the spirit of the invention. For example, the support A may be of the detachable type as illustrated in Fig. 2. The member A in this particular instance can be formed in two sections and rest upon the internally projecting bead 17 formed in the container.

A further example of an embodiment of the invention is in Fig. 3 wherein it will be observed that the spoon supports 18 are formed integral with the friction grip 19 and at the same time are spaced in independent relation. The aperture 20 formed in the member 18 is for the reception of the bowl portion of the spoon 15. As illustrated in Fig. 5, the lower lip 21 of the members 18 may be pressed inwardly to form additional projection upon which to rest the spoon. This, however, is a matter of choice and it is not intended that the inward projection will in any manner interfere with the removal of the contents of the container.

In Fig. 4 the spoon supports are also integral with the friction grip, the only difference between the structure here disclosed and that of Fig. 3 is that the spoon supporting openings 20 extend completely around the skirt of the friction grip in series rather than being independent.

In the various modifications of detached supports illustrated in Figs. 7, 8, 9 and 10, each member takes on a slightly different formation without departing from the spirit involved. The form disclosed in Fig. 7 may be termed flat, while that shown in Fig. 8 is provided with an angularly disposed lip. In Fig. 9 the member A is substantially V-shaped and in Fig. 10 the form is conoidal. The support means disclosed in Fig. 11 illustrates the spoon support 10 as integral with the side wall of a container formed by inwardly grooving the wall, while Figs. 12 and 13 indicate the support in detachable insert form, composed of wire or the like and bent octagonally or otherwise.

Broadly speaking, the spoon support may take many different forms. In each of these modifications the support may be provided with means to permit the drip from a spoon or like dispensing device to return to the container without smearing the top or outside thereof. It will also be observed that the supports do not in any way interfere with the easy removal of the contents of the container B.

From the foregoing it will be readily seen that the present invention is extremely simple in construction and embodies a spoon support for containers of considerable utility. The practicability of the device becomes apparent as one realizes that after the spoon or other dispensing device is used the bowl thereof is rested in the aperture 20 or on the member A within the container with the handle thereof lying on the opposite top edge of the container. The spoon is preferably inverted and in this position the handle portion is held free of the container contents while the liquid or other material on the bowl of the spoon drains through the orifices in the supports and thus returns to the container.

It will be manifest from the foregoing description taken in conjunction with the accompanying drawing that my improved spoon supporting means for containers embodies features of novelty and extensible utility, and it is to be understood that changes could be made in the above, and many apparently widely different embodiments of the invention may be constructed within the scope of the appended claims without departing from the spirit of the invention. It is intended therefore that all matter contained in the said accompanying specification and drawing shall be interpreted as illustrative and not in a limitative sense.

What I claim as my invention is:—

1. Spoon support means for containers comprising in combination with a container, of an insert of annular formation provided with a series of orifices and means formed in the container for retaining the said insert at a predetermined level therewithin.

2. Spoon support means for containers comprising in combination with a container formed with bottom and side walls, of an insert of annular formation provided with a re-enforcing lip and means formed in the container side walls for retaining the insert in a predetermined position within the container.

ARTHUR GUY THATCHER.